(12) United States Patent
Liljestrand

(10) Patent No.: US 7,079,367 B1
(45) Date of Patent: Jul. 18, 2006

(54) ELECTRIC PLANT AND METHOD AND USE IN CONNECTION WITH SUCH PLANT

(75) Inventor: Lars Liljestrand, Vasteras (SE)

(73) Assignee: ABB Technology AG, Zurich (CH)

( * ) Notice: Subject to any disclaimer, the term of this patent is extended or adjusted under 35 U.S.C. 154(b) by 477 days.

(21) Appl. No.: 10/129,266

(22) PCT Filed: Nov. 6, 2000

(86) PCT No.: PCT/SE00/02169

§ 371 (c)(1),
(2), (4) Date: Oct. 9, 2002

(87) PCT Pub. No.: WO01/33685

PCT Pub. Date: May 10, 2001

(30) Foreign Application Priority Data

Nov. 4, 1999 (SE) .................................. 99040149

(51) Int. Cl.
*H02H 3/00* (2006.01)

(52) U.S. Cl. ........................................................ 361/62
(58) Field of Classification Search .................. 361/87, 361/63, 62
See application file for complete search history.

(56) References Cited

U.S. PATENT DOCUMENTS

| | | | |
|---|---|---|---|
| 3,558,981 A * | 1/1971 | Zocholl | 361/44 |
| 4,130,850 A | 12/1978 | Cronin et al. | |
| 4,184,186 A * | 1/1980 | Barkan | 361/10 |
| 5,933,308 A * | 8/1999 | Garzon | 361/62 |
| 6,518,865 B1* | 2/2003 | Al-Hosini et al. | 335/147 |
| 2003/0112574 A1* | 6/2003 | Inami et al. | 361/115 |
| 2005/0201028 A1* | 9/2005 | Inami et al. | 361/62 |

FOREIGN PATENT DOCUMENTS

| | | | |
|---|---|---|---|
| DE | 1 588457 A | * | 2/1971 |
| DE | 1588457 | * | 2/1971 |
| FR | 2493031 | | 4/1982 |
| GB | 1121078 | * | 7/1968 |
| GB | 1121078 A | * | 7/1968 |

* cited by examiner

*Primary Examiner*—Brian Sircus
*Assistant Examiner*—Boris Benenson
(74) *Attorney, Agent, or Firm*—Oblon, Spivak, McClelland, Maier & Neustadt, P.C.

(57) ABSTRACT

An electric plant with a safety device, a method for remedying faults in a switchgear installation, and the use of a closing contact to provide security against faults. The plant includes a switchgear installation, consumer loads connected to the switchgear installation, and at least one feeder cable to the switchgear installation. The plant provides a strong consumer network that still has a high degree of safety against damage caused by short-circuiting faults. The plant includes at least two feeder cables, each connected to its own current source such as a transformer or a generator. At least one of the feeder cables is connected by a branch cable to ground. The branch cable is provided with a closing contact, which is normally open. The closing contact is arranged to be activated, i.e. to quickly close the connection to ground, in the event of short-circuiting in the switchgear installation.

16 Claims, 3 Drawing Sheets

ELECTRIC PLANT AND METHOD AND USE IN CONNECTION WITH SUCH PLANT

TECHNICAL FIELD

In a first aspect the present invention relates to an electric plant with a safety device of the type described in the preamble to claim 1.

In a second aspect the invention relates to a method of the type described in the preamble to claim 14, and in a third aspect to the use of a protective component in a switchgear station in accordance with claim 16.

The invention is primarily intended to protect a medium-voltage switchgear installation and the electrical system and components that receive their current from the switchgear installation. It relates primarily to switchgear installations supplying a current of 12 or 24 kV but is naturally not limited to these voltage levels. The term "medium voltage" in the present application shall thus be understood to relate to the whole interval from an ordinary end user level, e.g. 127 or 220 V, up to the limit of what is generally considered to be high voltage, i.e. 72.5 kV.

BACKGROUND ART

Short circuits can occur in all electric power systems at all voltage levels.

The consequences of a short circuit are a high current and a voltage drop in large parts of the network. The short-circuiting current also causes mechanical and thermal strain on all apparatus and equipment upstream of the fault location. In most cases an arc occurs in the fault location which, in combination with the high short-circuiting current, produces damages at the fault location that demand repairs but also incur risk of personal injury.

The consequences of short circuits depend on the duration of the short circuit, the amplitude of the current and the level of the voltage drop.

In order to minimise the consequences of a short circuit, its duration must be minimised.

When a short circuit occurs the breaker closest upstream of the fault shall disconnect the short circuit. The duration of a short circuit depends on how quickly it can be detected and how long is required to disconnect it.

The consequences of a short circuit are also dependent on where it occurs in an electrical system.

Short circuits can be divided into three groups as regards where the fault occurs:
A. Short circuit on the supply side
B. Short circuit in the switchgear installation.
C. Short circuit on an out-going group.

Regardless of where the fault occurs, all apparatus and components must be dimensioned for a short circuit producing the highest short-circuiting current. If the short-circuiting current exceeds the rated data existing on the apparatus, the system must be altered so that the short-circuiting current is kept at the levels the switchgear installation and breakers can handle. A usual measure is to divide the supply side between two transformers and busbars. Nowadays 64 kA is the highest short-circuiting current permitted for breakers and switchgear installations.

If a short circuit occurs in a switchgear installation, the switchgear installation and breaker on the supply side must be dimensioned for the estimated short-circuiting current. The switchgear installation must also be dimensioned so that it can withstand the pressure increase that occurs in the event of an arc in the switchgear installation.

Extremely large quantities of energy in the form of heat and radiation are released in arcs caused by large leakages. This energy gives rise to pressure increases in enclosed switchgear installations with restricted space, for instance, which may burst the enclosure. Such switchgear installations must therefore be equipped with bulky relief openings through which the hot gases can flow out. The high arc temperatures also cause the material in conductors and coupling equipment to melt, or even to be vaporised. Combustible organic material may also be ignited when it is subjected to the high temperatures and intense radiation of the arc. The arc also gives rise to toxic gases through decomposition of air (NOx) and vaporisation of metals. It is therefore usual for such switchgear installations to be provided with arrangements for pressure relief in the form of evacuation channels hatches that open automatically, etc. Such switchgear installations therefore become space consuming and expensive.

There has long been a great need in industry, first of all to prevent the occurrence of arcs and secondly to minimise the duration of arcs. Material damage as a result of the heat and pressure increase built up during the existence of the arc can therefore be reduced. The risk of personal injury and poisoning are also reduced.

It is therefore a matter of urgency to prevent as far as possible the occurrence of arcs and, when they do occur, to endeavour to extinguish them as quickly as possible. Breakers are normally used for this purpose. Besides being expensive, these breakers have the drawback of reacting relatively slowly. On the cable from the transformer, which supplies the switchgear from the external network, the breaking time is in the order of 200 ms because of the selectivity requirement of the relay protection. In the cables from the switchgear to the loads the breakers are normally capable of breaking more quickly, ca 40 ms. A breaking time of 200 ms is too long to effectively prevent damage as a result of arcs being formed. When an arc appears in the switchgear installation itself, therefore, other measures must be taken to quickly extinguish the arc. A branch cable to earth from the feeder cable from the transformer is sometimes arranged for this purpose and provided with a normally open closing contact, which, in the event of a short-circuiting fault, connects the feeder cable to earth so that the arc is extinguished. The operating time for such a closing contact is normally around 20 ms.

For practical reasons, this method is not used for arcs appearing in the system after the switchgear installation. Neither is the same saving in time so significant in relation to the time it takes for the breakers in these cables to be activated, i.e. ca. 40 ms.

An operating time of 20 ms for a closing contact is often sufficient to prevent the arc from causing major damage. However, even during this time a certain amount of havoc can occur and it would be desirable to be able to achieve even shorter operating times.

Upon short-circuiting in an out-going group the breaker on the out-going group must be dimensioned to be able to break the short-circuiting current that occurs and the switchgear installation must be dimensioned to handle the same short-circuiting current.

A particular problem exists in systems where the switchgear installation receives currents from two or more feeder cables. This is becoming increasingly usual in industry. One reason is that a strong net is desirable, i.e. with high short-circuiting effect, in order to avoid voltage fluctuations when loads with high output are connected. In most cases this means the start of large motors. A strong network is achieved by increasing the number of incoming supplies to the switchgear installation or by connecting together the busbar systems of two or more switchgear installations.

Another case where several feeder cables are used is when a local generator is connected to the switchgear installation. This is becoming increasingly usual. Many industries make use of waste energy from their own processes to generate electricity. This is usually supplied to the public network after step-up transformation. By instead supplying their own consumption the cost of a transformer is saved and the system becomes strong.

The principal drawback of connecting switchgear installations together or having several supplies to a switchgear installation from the transformer and/or generator is the high short-circuiting currents that appear in the medium-voltage system. The leakage in the medium-voltage system consists of the sum of the currents from the various feeder cables and the rated data for switchgear installation and breaker may be exceeded. This can nowadays been remedied by arranging a current limiter between the various switchgear installations or between the various parts of a switchgear installation with several feeders. However, this is an extremely expensive solution and entails other complications.

ACCOUNT OF THE INVENTION

Against this background, the object of the present invention is to provide a plant with a safety device which, in an efficient, reliable, simple and cost-effective manner, is able to provide a strong consumer network but which still has a high degree of safety against damage caused by short-circuiting faults.

This object has been achieved in a first aspect by a plant of the type described in the preamble to claim 1 being provided with the special features defined in the characterizing part of the claim.

The term "switchgear installation" in the claims shall be understood to mean not only an individual switchgear installation but also two or more switchgear installations that are connected on the same potential since, from the electrical point of view, such an arrangement is in principle equivalent to one switchgear installation.

At least one of the feeder cables to the switchgear installation or busbars is thus provided with a closing contact to earth. Thanks to the closing contact which, in the event of short circuiting in the switchgear installation, quickly connects one of the feeder cables to earth, an arc that arises as a result of a short circuit in the added system can quickly be extinguished before any substantial damage occurs. It is thus possible to take advantage of the benefits offered by a network with several feeder cables, without the additional current entailing increased risk of damage due to short-circuiting. The closing contact thus constitutes a short-circuiting diverter. The need for breakers on the out-going groups from the switchgear installation is also eliminated. These may be replaced with load disconnectors.

In accordance with a preferred embodiment the closing contact is arranged to be activated if the fault occurs in the consumer systems the switchgear installation is supplying. Since then at least one of the feeder cables is earthed, the risk is eliminated of short-circuiting currents from the feeders being added together and reaching a level exceeding the top value from a feeder. The short-circuiting current will thus remain below the rated data for breaker and switchgear installation. The connection to earth must take place during the first periodic quarter of the current in order to limit the first current peak.

The closing contact is suitably triggered as a result of signals from fault indicators such as arc monitors, current and voltage sensors.

For optimal safety a closing contact should be arranged in connection with each feeder cable to the switchgear installation. Such an embodiment is extremely important in order to eliminate arcs in the switchgear installation itself, and provides increased reliability for reducing short-circuiting currents in the event of faults out in the consumer system. This thus constitutes another preferred embodiment of the invention.

As mentioned earlier, it is desirable to effect closing as quickly as possible. This offers increased competitive strength over alternative safety measures achieved by breaking. Thanks to short closing time the solution is particularly attractive even for remedying faults out in the consumer system where a breaker is not as slow as in the feeder cable. It is also important in this case for the closing to occur during the first periodic quarter. A closing contact has recently been developed that can close to earth in less than 5 ms in the medium voltage area. The use of a quick-action closing contact therefore constitutes yet another preferred embodiment of the claimed switchgear installation.

In accordance with a further advantageous embodiment the closing contact is arranged for galvanic closing, i.e. with low impedance. The lower the impedance, the greater proportion of the current will pass through the closing contact and the small proportion will pass through the fault location.

The closing contact is suitably of a type comprising a first electrode, a second electrode, a movable contact element enclosing them, and an actuator, said actuator comprising a helically wound first coil firmly established at the first electrode, which movable contact element comprises a flange abutting the coil, whereby a current pulse running in the coil produces a repulsion force between the coil and the flange, which throws the movable contact element to the second electrode and completes the switching. Such a closing contact can achieve closing times of less than 5 ms.

An extremely important area of application for the present invention is when the feeder cable receives its current directly from a generator, i.e. locally produced current. Thanks to the invention, such an arrangement becomes increasingly attractive from the cost aspect. This application therefore constitutes a preferred embodiment of the invention.

The above and other preferred embodiments of the invention are defined in the sub-claims to claim 1.

In a second aspect the object of the invention is achieved by a method of the type described in the preamble to claim 14 comprising the special features defined in the characterizing part of the claim.

In a third aspect this object has been achieved by the use of a closing contact as claimed in claim 16.

Thanks to the method and use claimed and the preferred embodiments thereof as defined in the claims dependent on claim 14 and claim 16, respectively, equivalent benefits are gained as defined above for the plant claimed.

The invention will be described in more detail in the following detailed description of preferred embodiments thereof with reference to the accompanying drawings.

DESCRIPTION OF EMBODIMENTS

Figure 1:
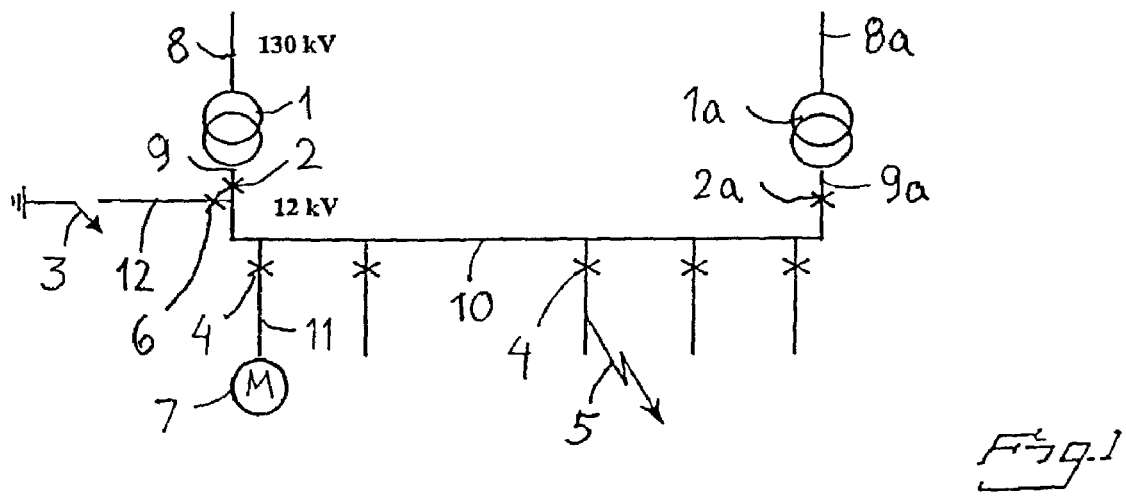
FIG. 1 is a circuit diagram illustrating a plant in accordance with a first embodiment of the invention.

FIG. 1 shows a switchgear installation supplied with current from two different cables 8, 8a from the network, a transformer 1, 1a being arranged in each cable for step-down transformation of the voltage to the feeder cables 9, 9a. Typical voltage levels are stated for the network and switchgear installation, respectively, but these are naturally only examples. The two feeder cables 9, 9a are connected to a common busbar 10. The switchgear installation shown may either be a single switchgear installation or be formed by connecting two switchgear installations to the common busbar. Cables 11 lead from the switchgear installation to the various loads 7 in the consumer system, represented by a motor in the figure.

A breaker 2, 2a is arranged in the feeder cable 9, 9a from each transformer 1, 1a, and a breaker 4 is similarly arranged in the cable 11 to each consumer point 7. A branch cable 12 runs from the feeder cable from the transformer on the left in the figure and can directly earth the feeder cable 9 galvanically by means of a closing contact 3.

Figure 4:
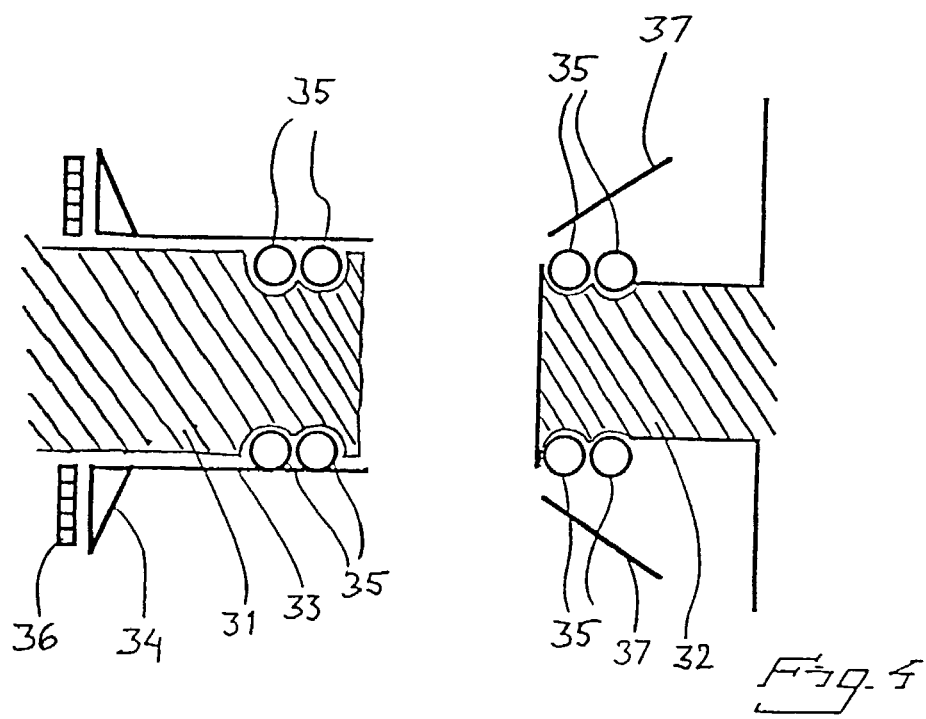
FIG. 4 shows a basic layout sketch of a closing contact suitable for use in a plant in accordance with the invention.
Figure 5:
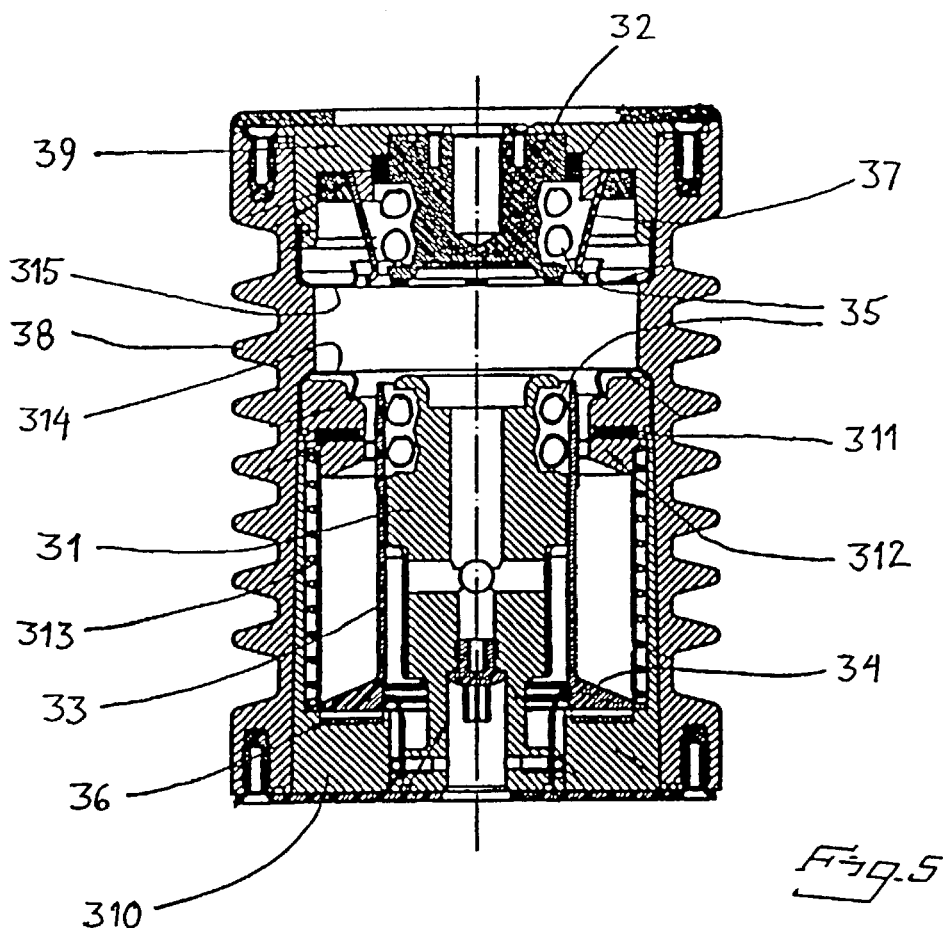
FIG. 5 shows an advantageous embodiment of the closing contact shown in FIG. 4.

The closing contact is described in more detail in conjunction with FIGS. 4 and 5. It is able to close in less than 5 ms. The closing contact is arranged to be activated when a short-circuit 5 appears in the system, either in the switchgear installation or on the consumer side. This can be achieved by monitoring by means of a current sensor, voltage sensor or arc monitors at suitable points, or by combinations of these. For the sake of clarity these detectors are not shown in the drawings but they may be of generally known, conventional type. Signals from the detectors are carried to the closing contact 3, which is thus activated so that the system is quickly earthed.

The closing contact prevents the short-circuiting currents from accumulating in the fault location, since one of the feeders is earthed and the contribution from the feeder to the short-circuiting current in the fault location is minimised. The demand for withstanding short circuits is thus reduced for breaker and switchgear installation. Once the system is earthed the breaker 4 is activated in the consumer cable 11 where the fault 5 occurred. The switchgear installation is then disconnected from the current supply by activation of the breakers 2 and 2a. The closing contact 3 can then be reset and break the earth connection, after which the breakers 2, 2a are reset and the switchgear installation again supplies current to the rest of the consumer loads in the system. Resetting may be performed automatically. If, instead, the fault appears in the actual switchgear installation the breakers 2, 2a will naturally be activated immediately earthing has occurred.

Figure 2:
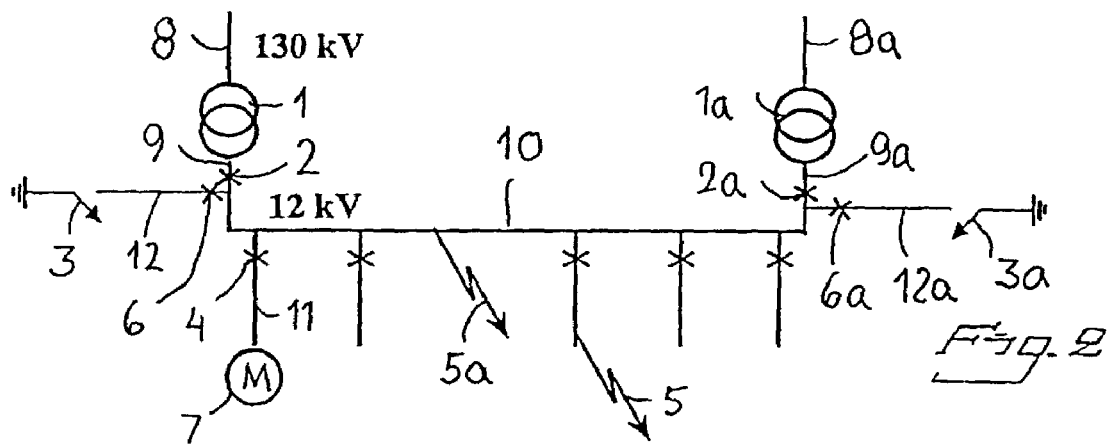
FIGS. 2–3 show the circuit diagram corresponding to FIG. 1 in accordance with two alternative embodiments of the invention.

FIG. 2 illustrates a switchgear installation corresponding to that in FIG. 1 except that a branch cable 12, 12a to earth, with closing contact 3, 3a, is arranged at each feeder cable 9, 9a. In this case both the closing contacts 3, 3a will be activated when a fault appears at any consumer load 5 or in the switchgear installation 5a. Otherwise the course of events corresponds to that for the embodiment shown in FIG. 1.

Figure 3:
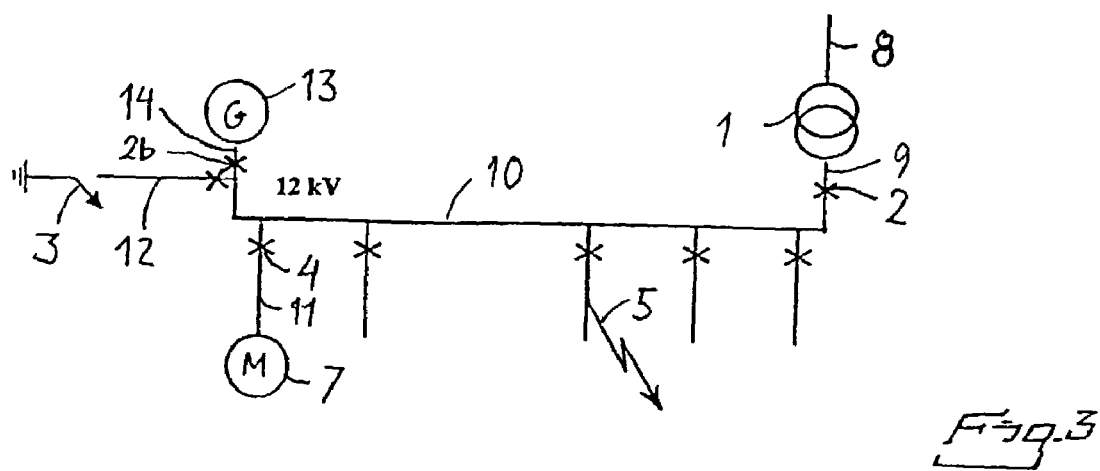

FIG. 3 illustrates the invention if there is only one incoming cable 8 with transformer 1 from the network, but where the current supply is supplemented by current auto-generated at the voltage level of the switchgear installation, i.e. without transformation. A generator 13 thus supplies current directly to the busbar 10 of the switchgear installation. A breaker is provided in the cable 14 from the generator 13, and galvanic earthing can be achieved via branch cable 12 with closing contact 3. The function is in principle the same as in the embodiment shown in FIG. 1, i.e. upon short-circuiting 5 in any part of the cable system or in the switchgear installation the closing contact 3 is activated and the course of events continues as described above in conjunction with FIG. 1. In this case also the branch cable 12 is preferably provided with a breaker. Similarly, a branch cable with closing contact to earth can also be arranged at the feeder cable 9 from the transformer 1.

A closing contact suitable for use in the plant is shown in FIG. 4. This includes a first contact part 31, a second contact part 32 and a movable contact part 33. The movable contact part is in the form of a sleeve. It surrounds the first contact part and is provided with a flange 34. A contact member 35 is arranged between the first and second contact part, respectively, and the movable contact part. In the embodiment shown by way of example these contact members are in the form of bands of helically wound conducting wire. The bands surround the first and second contact parts, respectively, and are arranged in grooves in each contact part. The helically wound shape allows the bands to abut against each contact part with spring force. The contact members are arranged to permit the movable contact part to move longitudinally while retaining low-ohmic contact with both the first and the second contact parts.

A first helical coil 36, a so-called Thomson coil, is arranged in conjunction with the flange 34. In the figure the helical coil is arranged immediately beneath the flange and the flange is arranged to abut the coil. When a current pulse flows through the coil from a current source, not shown, a variable magnetic field appears which induces eddy currents in the flange 34. The eddy currents in turn cause the formation of a magnetic field opposed to the first magnetic field. This gives rise to a strong repulsion force that throws the flanged sleeve 33 towards the other contact part.

A plurality of arc fingers 37 of spring steel are arranged around the second contact part. These are restrained in contact with the second contact part, in the upper part of the figure, with the free end, the finger top, directly obliquely towards the first contact part. The arc fingers are arranged to have a deflection with high resonance frequency. When the fingers encounter the advancing movable contact part they start to vibrate. The finger tops then bounce against the movable contact part. Each time the finger top leaves the surface of the movable contact part a small arc appears. However, a plurality of fingers are arranged around the contact part, all of them having different phases and different resonance frequency, one or other finger top is in contact at any moment with the movable contact part. These arcs are therefore eliminated.

FIG. 5 shows an advantageous embodiment of the closing contact. The embodiment includes all the parts mentioned in FIG. 4, these having the same designations. In the example shown the contacts are arranged in a casing of insulating material. The casing, preferably filled with protective gas, consists of a cylindrical wall 38, a top part 39 and a bottom 310 in the example shown.

Upon operation the movable contact part is thrown against the second contact part so that contact is produced between the first and second parts. This is achieved with the aid of contact members 35. In closed position the flange 34 abuts a hammer ring 312 which in turn abuts a second helical coil 311. The hammer ring is movable along the length of the movable contact part and is held in contact with the second helical coil by the force of a spring 313. The second spiral coil is anchored in the bottom part 310. When a current pulse from a current source, not shown, flows through the second helical coil a variable magnetic field appears which induces eddy currents in the hammer ring 312. The eddy currents in turn cause the formation of a magnetic field opposed to the first magnetic field. This gives rise to a strong repulsion force that throws the hammer ring towards the flange of the movable contact. The kinetic energy thus established is transferred to the flange of the movable contact part, which is thrown to its open resting position. If, for any reason, the movable contact part should not have fully reached its ON position the hammer ring will, by an impulse, transfer its kinetic energy to the movable contact. The illustrated solution for the breaking function is thus regardless of whether the previous closing operation was complete.

A screening ring 314 is arranged on a level with the end of the first contact part facing the end of the second contact part. In similar manner a screening ring 315 is arranged on a level with the end of the second contact part facing the end of the first contact part. The two screening rings are arranged to distribute the existing electric field between the first and second contact parts so that no field concentrations arise.

Figure 6:
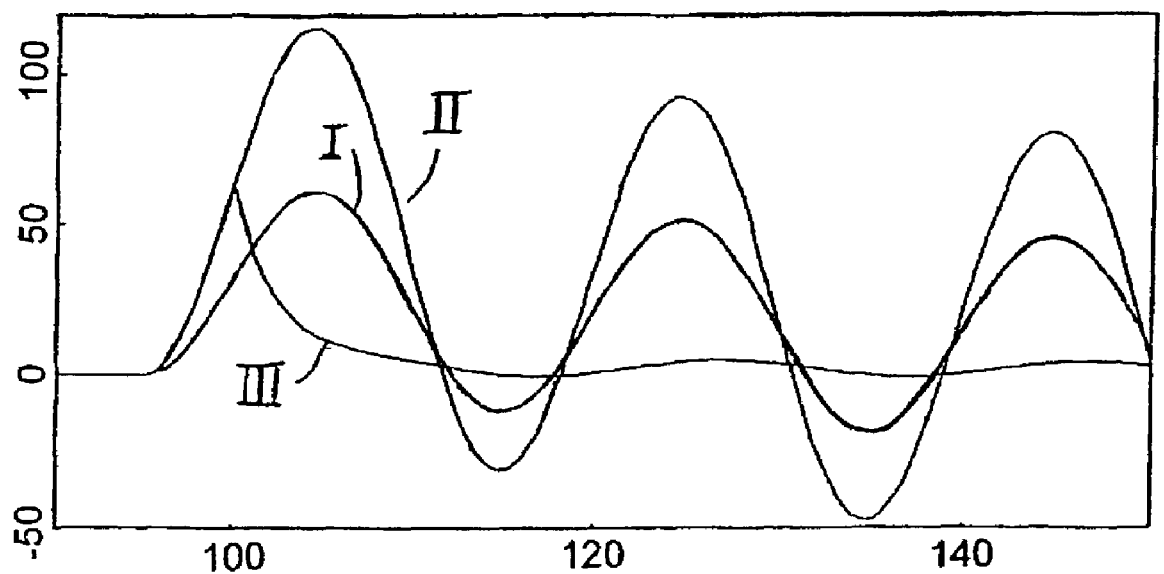
FIG. 6 is a flow diagram clearly illustrating the function of the invention.

FIG. 6 illustrates what happens upon short-circuiting out in the consumer system in a plant in accordance with the invention. The illustration refers to the embodiment with a closing contact at each incoming cable, i.e. in principal as shown in FIG. 2. Short-circuiting in the consumer system is designated 5 in FIG. 2. In FIG. 6 the curve I represents the leakage current that would occur if there were only one supply. Curve II shows the leakage in the case of two supplies, i.e. as shown in FIG. 2. Curve III shows the leakage with the use of closing contacts 3, 3a in FIG. 2. These are activated during the first periodic quarter, i.e. within 5 ms. The accumulated leakage according to curve III thus does not have time to exceed the top value for one supply, curve I, and breakers and other components in the switchgear installation that are dimensioned for the peak value at one supply will not be overloaded.

What is claimed is:

1. An electric plant with a safety device comprising:
a switchgear installation with a busbar; and
a first feeder cable and a second feeder cable connected to the busbar of the switchgear installation, the feeder cables being connected to at least one current source;
wherein the first feeder cable is connected to a first branch cable and to ground through a first closing contact,
wherein the second feeder cable is connected to a second branch cable and to ground through a second closing contact, and
wherein each closing contact is configured to be normally open and to close in an event of short-circuiting in the switchgear installation.

2. A plant as claimed in claim 1, wherein the first closing contact is configured to close in an event of short-circuiting at a consumer load.

3. A plant as claimed in claim 1, wherein each closing contact is configured to close in less than 5 ms.

4. A plant as claimed in claim 1, wherein each closing contact is configured for galvanic closing.

5. A plant as claimed in claim 1, wherein the first branch cable comprises a breaker in series with the first closing contact.

6. A plant as claimed in claim 1, wherein the first feeder cable comprises a breaker arranged between the at least one current source and the first branch cable.

7. A plant as claimed in claim 5, wherein said breaker in series with the first closing contact is arranged to break a current automatically after the first closing contact is closed.

8. A plant as claimed in 7, wherein the first closing contact is configured to be reset after current has been disconnected.

9. A plant as claimed in claim 1, wherein the at least one current source comprises a generator.

10. A plant as claimed in claim 1, wherein the at least one current source comprises a transformer.

11. A plant as claimed in claim 1, wherein the switchgear installation is a medium voltage switchgear installation.

12. An electric plant with a safety device comprising:
a switchgear installation with a busbar; and
at least a first feeder cable and a second feeder cable connected to the busbar of the switchgear installation, which feeder cables are each connected to a current source;
wherein each feeder cable is connected to a branch cable to ground and each branch cable is provided with a closing contact, normally open, which is configured to be activated in an event of short-circuiting in the switchgear installation,
wherein each closing contact is configured for galvanic closing, and
wherein each closing contact comprises a first electrode, a second electrode, a movable contact element enclosing the first and second electrodes, and an actuator, said actuator comprising a helically wound coil firmly established at the first electrode, the movable contact element comprising a flange abutting the coil, whereby a current pulse running in the coil produces a repulsion force between the coil and the flange, which throws the movable contact element to the second electrode to complete switching.

13. A method for remedying faults in an electric plant comprising a switchgear installation with a busbar and a first feeder cable and a second feeder cable connected to the busbar of the switchgear installation, the feeder cables connected to at least one current source, wherein a first branch cable is connected to ground through a first closing contact and is connected to the first feeder cable, wherein a second branch cable is connected to ground through a second closing contact and is connected to the second feeder cable, and each closing contact is configured to be normally open and to close in an event of short-circuiting in the switchgear installation, the method including closing at least one of the closing contacts in the event of a short circuit.

14. A method as claimed in claim 13, wherein the method is performed in the plant in which the first closing contact is configured to close in an event of short-circuiting at a consumer load.

15. The use of first and second closing contacts in an electric plant comprising a switchgear installation, a consumer load connected to the switchgear installation, and first and second feeder cables connected to the switchgear installation and connected to at least one current source, the first feeder cable being connected to a first branch cable and to ground through the first closing contact, the second feeder cable being connected to a second branch cable and to ground through the second closing contact, and each closing contact configured to be normally open and to close in an event of short-circuiting in the switchgear installation.

16. The use as claimed in claim 15, wherein the first closing contact is used in the plant in which the first closing contact is configured to close in an event of short-circuiting at the consumer load.

* * * * *